United States Patent [19]

Kobayashi et al.

[11] Patent Number: 4,796,250
[45] Date of Patent: Jan. 3, 1989

[54] OPTICAL RECORDING AND REPRODUCING APPARATUS INCLUDING A DISC EXTRACTION AREA FOR POWER SETTING A LASER

[75] Inventors: Seiji Kobayashi, Tokyo; Kiyoshi Ohsato, Chiba, both of Japan

[73] Assignee: Sony Corporation, Tokyo, Japan

[21] Appl. No.: 74,865

[22] Filed: Jul. 17, 1987

[30] Foreign Application Priority Data

Aug. 13, 1986 [JP]  Japan .................. 61-188388

[51] Int. Cl.⁴ .................. G11B 3/90; G01J 1/32
[52] U.S. Cl. .................. 369/54; 369/106; 369/116; 369/278; 369/280; 250/205
[58] Field of Search .............. 369/54, 106, 116, 275, 369/278, 280; 250/205; 372/29, 31, 33

[56] References Cited

U.S. PATENT DOCUMENTS

| 4,344,173 | 8/1982 | Straus .................. 372/29 |
| 4,443,870 | 4/1984 | Hazel et al. .................. 369/44 |
| 4,516,242 | 5/1985 | Yokota .................. 372/29 |
| 4,523,089 | 6/1985 | Maeda et al. .................. 250/205 |
| 4,562,567 | 12/1985 | Frankfort et al. .................. 369/54 X |
| 4,660,189 | 4/1987 | Tsukamura et al. .................. 369/54 X |
| 4,685,097 | 8/1987 | van der Put .................. 369/116 |
| 4,689,795 | 8/1987 | Yoshimoto et al. .................. 372/31 |
| 4,742,505 | 5/1988 | Takeuchi et al. .................. 369/116 |
| 4,750,161 | 6/1988 | Takeuchi et al. .................. 369/116 X |

FOREIGN PATENT DOCUMENTS

| 55-107284 | 8/1980 | Japan .................. 372/29 |
| 56-153542 | 11/1981 | Japan .................. 369/116 |
| 58-199446 | 11/1983 | Japan .................. 372/29 |

Primary Examiner—William L. Sikes
Assistant Examiner—Brian M. Healy
Attorney, Agent, or Firm—Lewis H. Eslinger

[57] ABSTRACT

An apparatus for recording and reproducing data into/from an optical disc, which includes an optical disc having an optical recording medium into and from which data can be written and erased, a laser diode to write, erase, and read out data into and from the optical disc, and a power setting circuit for sampling and holding a detection output from a photo diode to detect the light emission power of the laser diode, for comparing the value sampled and held with a target value, and for setting the power of laser diode. A light emission power of laser diode in each of the data writing, erasing, and reading modes is controlled by the power setting means. A part of a recording area of the optical disc is provided with an extracting area to sample and hold the detection output from the photo diode.

10 Claims, 5 Drawing Sheets

CHARACTERISTIC OF THE LASER DIODE

OPTICAL RECORDING AND REPRODUCING APPARATUS INCLUDING A DISC EXTRACTION AREA FOR POWER SETTING A LASER

FIELD OF THE INVENTION

The present invention relates to an apparatus for recording and reproducing data into/from an optical disc in which data based on an information signal can be erased and rerecorded and, more particularly, to a control of an output of a laser diode for use in a light source of such a data recording and reproducing apparatus.

DESCRIPTION OF THE RELATED BACKGROUND ART

There have been known a read-only optical disc (e.g., compact disc, optical video disc, etc.) in which data based on various kinds of information signals cannot be erased and rerecorded at all, a write-once type optical disc in which data can be recorded but cannot be erased, and an optical disc in which data based on various kinds of information signals can be erased and rerecorded. For example, a magnetooptic disc has been known as such a type of optical disc. In a magnetooptic disc, data is recorded by the magnetization direction in a manner similar to the perpendicular magnetic recording system. Namely, in a magnetooptic disc, a perpendicular magnetization film in which the magnetization direction is oriented perpendicularly to the disc surface is used as a recording medium. This recording medium has a certain coercive force at an ordinary temperature, whereby the magnetization direction does not change, and in an initial state before data is recorded or in a state in which the recorded data was erased, the magnetization direction is oriented in a constant direction. When a recording beam, e.g., a laser beam, is irradiated onto a recording medium, a temperature of the beam irradiated portion rapidly increases. When the temperature has reached a Curie temperature or a compensation temperature, the coercive force decreases. Therefore, a weak magnetic field is applied from the outside by an external magnetic field generating means. In this state, by irradiating a recording beam, e.g., applying a laser beam onto a recording medium of a disc, the temperature of the beam irradiated portion promptly increases and the magnetization direction of the recording medium is reversed in accordance with the direction of the magnetic field generated from the external magnetic field generating means. Thus, data is written. In the case of reading data, a reproducing beam, e.g., a laser beam having a power which is sufficiently smaller than the irradiation power when data is written, is irradiated onto a disc, and a rotational angle of a rectilinear plane of polarization of the reflected light is detected.

On the other hand, in the case of erasing the data written in the disc, the direction of the magnetic field which is generated from the external magnetic field generating means is held constant and at the same time, by irradiating an erasing beam, e.g., applying a laser beam onto a desired portion of a recording medium of the disc, the magnetization direction of the recording medium is oriented to a constant direction in accordance with the direction of the magnetic field generated from the external magnetic field generating means on the basis of a principle similar to that when data is written. In this manner, data is erased.

Figure 1:
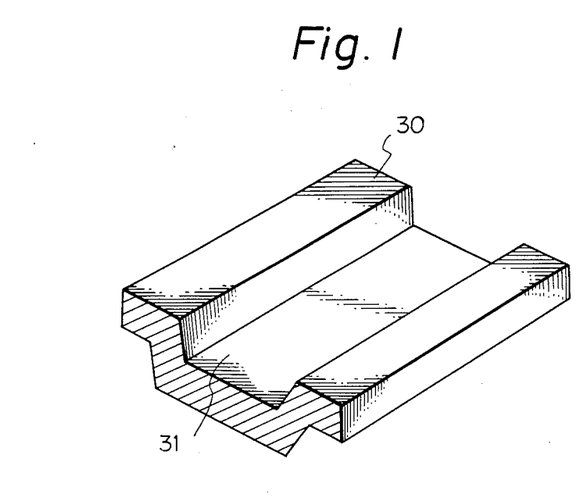
FIG. 1 is a perspective view for explaining a guide groove in a conventional optical disc.
Figure 2:
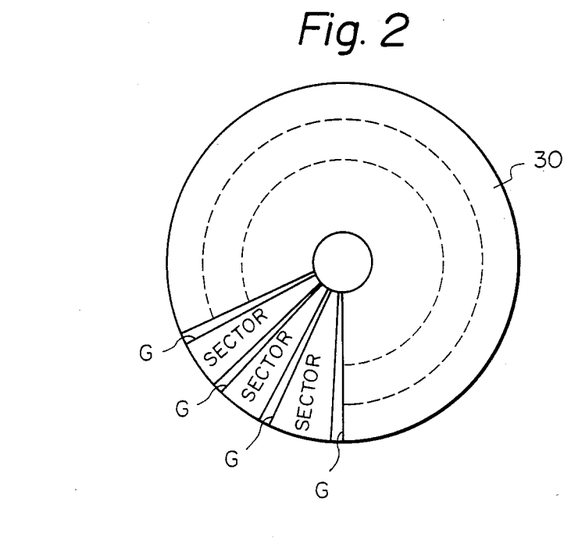
FIG. 2 is a perspective view for explaining a conventional optical disc.

Hitherto, as shown in FIG. 1, a guide groove 31 for tracking is formed in such an erasable and rerecordable optical disc 30. A laser beam is emitted from a laser light source of an optical head (not shown) which can be freely moved in the radial direction of an optical disc. A tracking servo is applied to an ojective lens drive apparatus (not shown) of the optical head so that the emitted laser beam can trace along the guide groove 31, so that data is recorded along the guide groove 31. As shown in FIG. 2, an area of the disc 30 is divided into, e.g., 32 sectors per rotation. Data is read out or written every sector.

Figure 3:
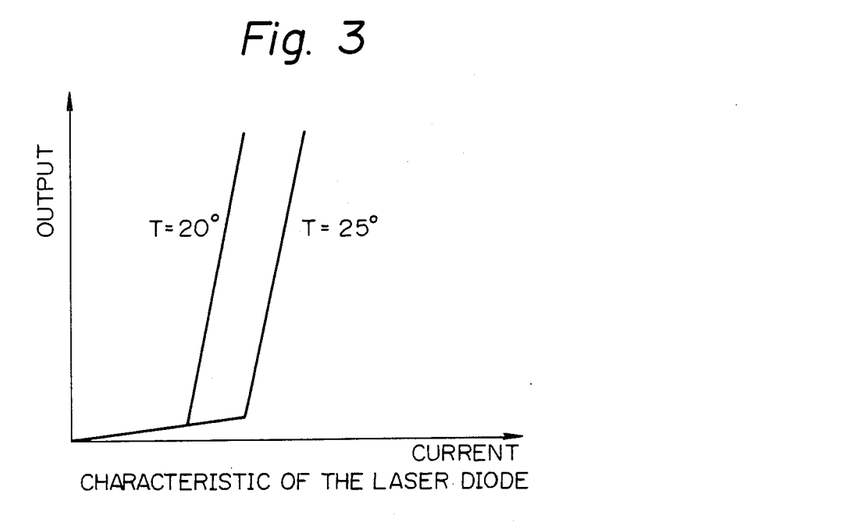
FIG. 3 is a graph showing the characteristic of a laser diode.

In the case of an erasable and rerecordable optical disc, as mentioned above, a laser beam is used to read out and write data. A laser diode is used as a laser beam emitting source. The optimum value of the power of the laser beam differs in each of the reading, writing, and erasing modes. Namely, as mentioned above, in the case of writing data, in order to reverse the magnetization direction of a recording medium of an optical disc, a laser beam from a laser diode is irradiated onto the recording medium and a temperature of the recording medium needs to be raised to a temperature near the Curie temperature or the compensation temperature. Therefore, the largest power is necessary in the writing mode. If a sufficiently large power is not obtained in the writing mode, the temperature of the recording medium in the portion to which a laser beam was irradiated does not reach the Curie temperature, so that the magnetization direction cannot be reversed. Therefore, data is not sufficiently written. On the other hand, if the power is too large in the reading mode, data is further written by a reading laser beam onto the data which has already been written into a disc, so that the written data may be broken. As shown in FIG. 3, the power of a laser diode largely changes due to a change in temperature and also largely varies in dependence on an elapse of time.

Therefore, in the case of using a laser diode as a laser light source of an apparatus for recording and reproducing data into/from an optical disc, it is necessary to use a servo circuit adapted to keep the laser diode power of the optimum value. Such a servo circuit is called an automatic power control (APC) circuit.

Figure 4:
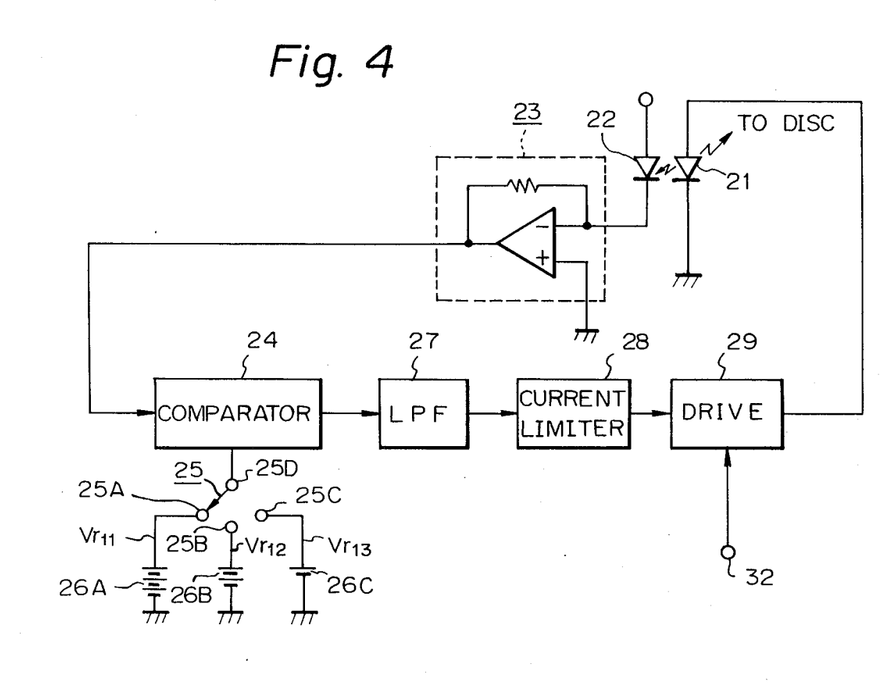
FIG. 4 is a block diagram showing a conventional APC circuit.

FIG. 4 shows an example of an APC circuit for use in a conventional magnetooptic disc recording and reproducing apparatus. In FIG. 4, a laser diode 21 is the light source. A laser beam from the laser diode 21 is irradiated onto a magnetooptic disc. Light emission power of the laser diode 21 is detected by a monitoring photo diode 22 disposed near the laser diode 21.

In general, the light fluxes corresponding to an intensity of an emitted laser beam (in this case, the light fluxes are referred to as monitor lights) are emitted from both the edge surface of the laser diode that emits the laser beam onto the disc and also from the edge surface on the opposite side thereof. These monitor lights are detected by the photo diode 22. Namely, the monitor lights according to the light emission power of the laser diode 21 are received by the photo diode 22 and a current corresponding to the received monitor lights flows through the photo diode 22.

A detection current of the photo diode 22 is converted into a voltage value by a current-voltage (I-V) converting circuit 23. An output of the I-V converting circuit 23 is supplied to a comparator 24. Target voltages $Vr_{11}$, $Vr_{12}$, and $Vr_{13}$ are selectively supplied to the comparator 24 through a switch 25. Namely, when terminals 25A and 25D of the switch 25 are connected, the target voltage $Vr_{11}$ for the writing mode is supplied from a voltage source 26A to the comparator 24. When terminals 25B and 25D are connected, the target voltage $Vr_{12}$ for the erasing mode is supplied from a voltage source 26B to the comparator 24. When terminals 25C and 25D are connected, the target voltage $Vr_{13}$ for the reading mode is supplied from a voltage source 26C to the comparator 24. In this manner, each target voltage is selectively supplied to the comparator 24 by the switch 25 whose switching operation is controlled by control means (not shown) in accordance with each of the writing, erasing, and reading modes.

The output of the comparator 24 is supplied to a current limiter 28 through a low pass filter 27. The current limiter 28 is provided to prevent an overcurrent from flowing through and breaking the laser diode 21. An output of the current limiter 28 is supplied to a drive circuit 29 and an output of the drive circuit 29 is supplied to the laser diode 21. A laser beam corresponding in intensity to the output of the drive circuit 29 is emitted from the laser diode 21 and irradiated onto the magnetooptic disc. On the other hand, in the writing mode, a modulation signal based on an information signal to be recorded is supplied from a terminal 32 to the drive circuit 29. Thus, a laser beam is modulated by the modulation signal and the switch 25 is switched by control means (not shown) and the laser beam having a predetermined power in the writing mode is generated from the laser diode 21.

As mentioned above, the output of the laser diode 21 is detected by the photo diode 22. The detection output of the photo diode 22 is compared with the target value in each of the writing, erasing, and reading modes by the comparator 24. The light emission output of the laser diode 21 is controlled so as to become constant at the target value in each of the writing, erasing, and reading modes in accordance with the output of the comparator 24.

However, it takes an appreciable amount of time until the APC circuit becomes stable. Namely, for example, when the operating mode was changed from the reading mode to the writing mode, the target voltage is switched from $Vr_{13}$ to $Vr_{11}$ and the light emission power of the laser diode 21 is increased. However, the power of the laser diode 21 does not immediately rise to the target value in the writing mode from the target value in the reading mode and is not stable until it reaches the target value. Therefore, as shown in FIG. 2, a conventional optical disc is provided with a gap G between sectors. No effective data is recorded in the gap G. After the operation of the APC circuit has stabilized, the writing, reading, or erasing operation is performed.

Therefore, in a conventional optical disc, since the gap G in which effective data is not recorded until the APC circuit becomes stable is formed between sectors, a recording area of the recording medium of the disc cannot be effectively used and recording density cannot be increased. Further, as mentioned above, the guide groove 31 for tracking is formed in a conventional optical disc. Such a guide groove 31 causes a problem in that noise from the guide groove 31 is picked up, or a carrier-to-noise (C/N) ratio deteriorates and the reliability of data also deteriorates. To avoid such a problem, a method whereby a tracking servo is applied without forming the guide groove 31 is considered. Namely, for example, as disclosed in U.S. Pat. No. 4,443,870 and the like, a plurality of servo areas are provided in a disc and servo pits for tracking are formed in the servo areas.

The tracking servo is applied in the servo area interval on the basis of the tracking error information which is obtained from the servo pits.

In the case where a tracking error is detected from the servo pits in the servo area and a tracking is controlled as described above, response speed of the APC circuit becomes a problem. Namely, in the case where tracking control was performed by the foregoing method, the servo area is certainly set into the reading mode in order to read out the servo pits. Since the servo area certainly enters the reading mode, in the case of writing data into a disc, it is necessary to set the power of the laser diode to the optimum value in the reading mode in the servo area and the power of the laser diode needs to be immediately set to the optimum value in the writing mode in a recording area. Namely, in FIG. 4, the terminals 25C and 25D are connected in the servo area and the terminals 25A and 25D are connected in the recording area. However, since it takes a predetermined time until the operation of the APC circuit becomes stable, when a laser beam moves from the servo area to the recording area, the power of the laser diode does not promptly become the optimum value.

Therefore, it has been proposed that a gap such as the gap G provided between sectors as shown in FIG. 2 be formed between the servo area and the recording area. However, the formation of gaps results in a decrease in recording density of the disc in a manner similar to the case of the optical disc in FIG. 2, so that the recording area for effective data is hardly obtained. On the other hand, it has also been proposed to omit the low pass filter 27 in order to increase the operating speed of the APC circuit. However, according to this proposal, the operation of the APC circuit does not become stable.

OBJECT AND SUMMARY OF THE INVENTION

It is, therefore, an object of the present invention to provide an apparatus for recording and reproducing data into/from an optical disc in which the power of a laser beam can be instantaneously controlled to the optimum value in each of the writing, reading, and erasing modes without reducing of the disc recording density.

According to the present invention, an apparatus for recording and reproducing data into/from an optical disc comprises: a laser diode; a photo diode to detect a light emission power of the laser diode; a sample and hold circuit to sample and hold a detection output of the photo diode; a comparator to compare an output of the sample and hold circuit with a target value; and a loop filter which is supplied with a comparison output of the comparator, wherein an extracting area in which the detection output is sampled and held by the sample and hold circuit is provided in a part of a recording area of the disc, and the power of the laser diode in the recording mode is controlled on the basis of the value which was sampled and held in the extracting area.

Figure 7:
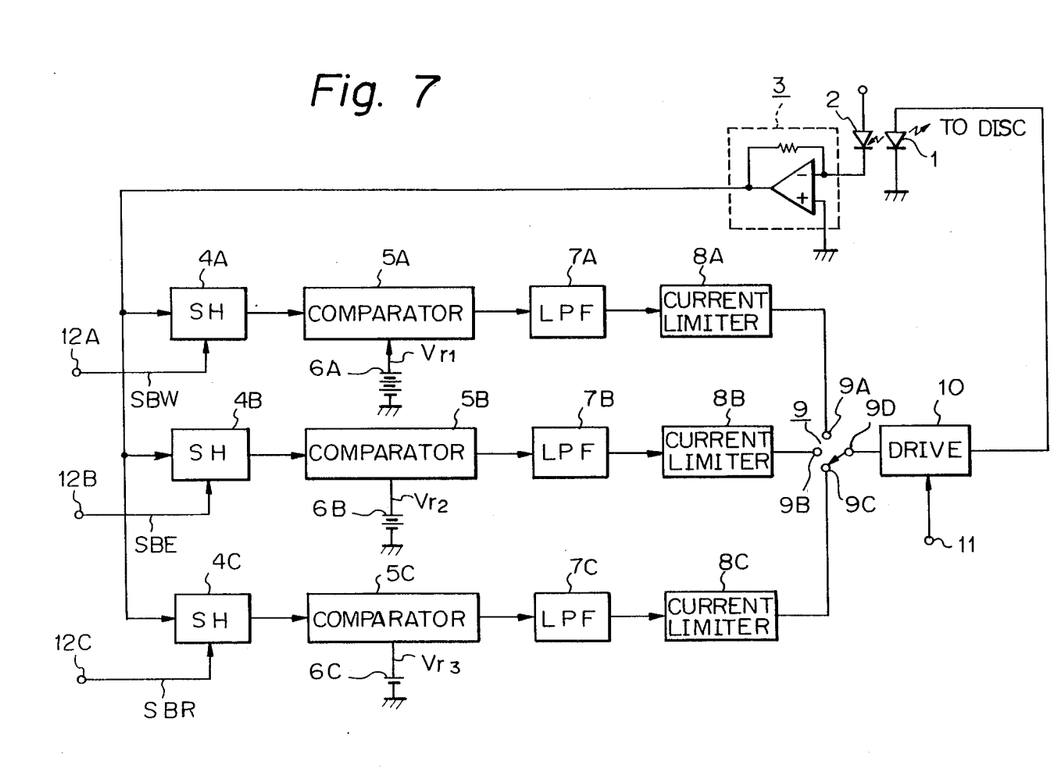
FIG. 7 is a block diagram of an embodiment of the invention.

The power of the laser diode 1 is detected by the photo diode 2. The detection output in a first servo area $SA_1$ is held in a sample and hold circuit 4C. The detection output in a second servo area $SA_2$ is stored in sample and hold circuits 4A and 4B. The power of the laser diode 1 in the reading mode is controlled on the basis of the detection output held in the sample and hold circuit 4C. The powers of the laser diode 1 in the writing and reading modes are controlled on the basis of the detection outputs held in the sample and hold circuits 4A and 4B. Due to this, an APC loop in the writing, erasing, or reading mode becomes stable. Therefore, when the operating mode is switched, the light emission power of the laser diode 1 can be immediately set to a target value.

The above and other objects, features, and advantages of the present invention will become more apparent from the following detailed description in conjunction with the accompanying drawings.

DETAILED DESCRIPTION OF A PREFERRED EMBODIMENT

An embodiment of the present invention will be described hereinbelow with reference to the drawings.

Figure 5:
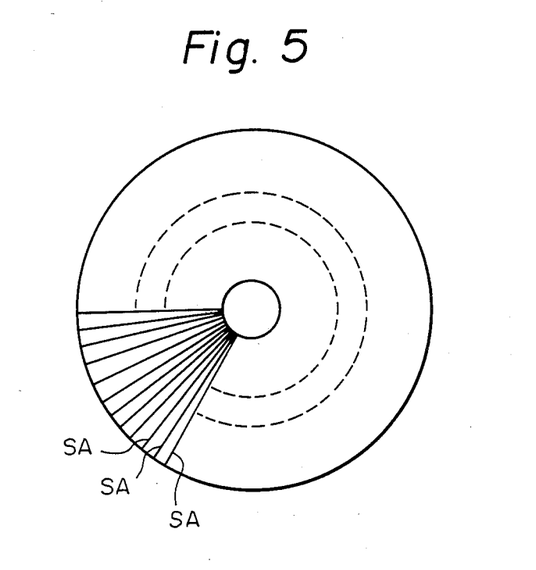
FIG. 5 is a schematic diagram for explaining an optical disc which is used in an embodiment of the present invention.
Figure 6:
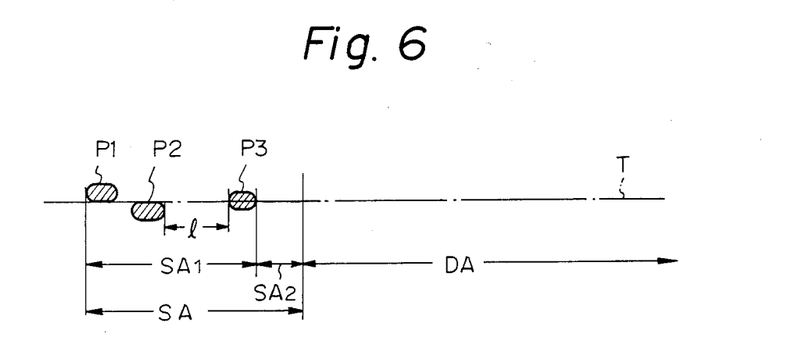
FIG. 6 is a schematic diagram for explaining a servo area in an embodiment of the invention.

An embodiment of the invention is applied to an apparatus for recording and reproducing data into/-from an erasable and rerecordable optical disc, e.g., a magnetooptic disc. As shown in FIG. 5, a magnetooptic disc which is used in the embodiment is formed with a plurality of, e.g., 1300, servo areas SA per circumference. In the servo area SA, a tracking control is performed for an objective lens drive apparatus (not shown) of an optical head (not shown) which is controlled such that a laser beam emitted from a laser diode is focused onto the surface of a recording medium of the magnetooptic disc. Therefore, such a guide groove for a tracking servo as shown in FIG. 1 is not provided. The servo area SA further consists of a servo area SA$_1$ and a servo area SA$_2$. As shown in FIG. 6, pits P$_1$, P$_2$, and P$_3$ are formed in the servo area SA$_1$. The pits P$_1$ and P$_2$ are used to perform a tracking control for the objective lens drive apparatus. Namely, the pits P$_1$ and P$_2$ are arranged at positions which deviate in the opposite directions from the center of track T. When a laser beam passes over the pits P$_1$ and P$_2$, the operating mode is set to the reading mode and a tracking servo is applied to the objective lens drive apparatus so that reproduction signals of the pits P$_1$ and P$_2$ are equalized. Thus, the laser beam scans the center between the pits P$_1$ and P$_2$, i.e., the center line of the track T. The pit P$_3$ is provided to form a reference signal to reproduce a bit clock. An area 1 in which no pit is formed is provided in the portion between the pit P$_2$ and the pit P$_3$. The servo area SA$_2$ is provided subsequent to the servo area SA$_1$. The area 1 in which no pit is formed and the servo area SA$_2$ are provided to control the operation of the APC circuit of the laser diode and will be explained in detail hereinafter.

FIG. 7 shows an embodiment of the invention, wherein reference numeral 1 denotes a laser diode. A laser beam emitted from the laser diode 1 is irradiated onto an optical disc. Light emission power of the laser diode 1 is detected by a monitoring photo diode 2 disposed near the laser diode 1 as mentioned above. Namely, the light fluxes which are emitted from the edge surface as a laser beam which is irradiated from the laser diode 1 onto a magnetooptic disc and from the edge surface on the opposite side in accordance with a light emission power of the laser diode 1 are received by the photo diode 2. Thus, a current corresponding to the received light fluxes flows through the photo diode 2. The current flowing through the photo diode 2 is converted into a voltage value by an I-V converting circuit 3. An output of the I-V converting circuit 3 is supplied to sample and hold circuits 4A, 4B, and 4C.

Figure 8:
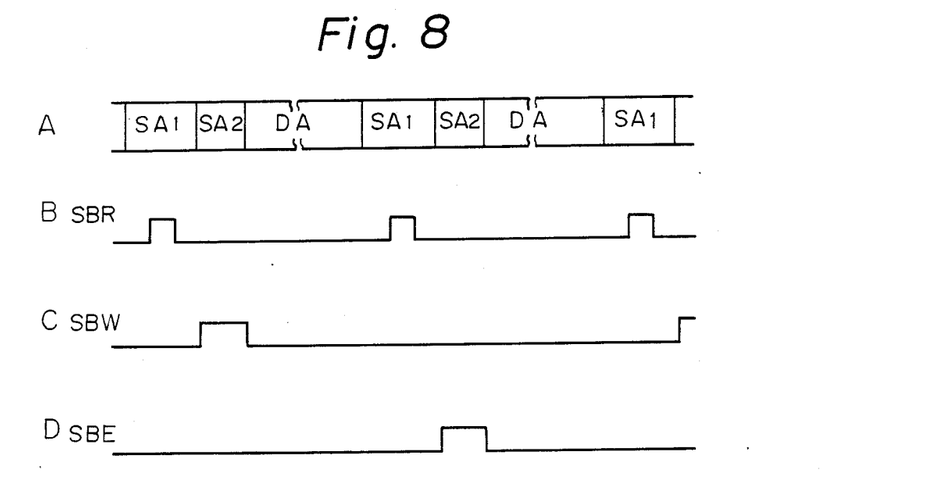
FIG. 8 is a timing chart for explaining an embodiment of the invention.

Sampling pulses SBW, SBE, and SBR are respectively supplied from terminals 12A, 12B, and 12C to the sample and hold circuits 4A, 4B, and 4C. The sampling pulses SBW, SBE, and SBR are generated at timings as shown in FIG. 8. When the sampling pulses SBW, SBE, and SBR are respectively set to the high level, the output of the I-V converting circuit 3 is sampled and held in the sample and hold circuits 4A, 4B, and 4C.

The outputs of the sample and hold circuits 4A, 4B, and 4C are supplied to comparators 5A, 5B, and 5C, respectively. Target voltages Vr$_1$, Vr$_2$, and Vr$_3$ are applied from voltage sources 6A, 6B, and 6C to the comparators 5A, 5B, and 5C, respectively. The voltage Vr$_1$ corresponds to a target power in the writing mode in the voltage Vr$_2$ corresponds to a target power in the erasing mode and the voltage Vr$_3$ corresponds to a target power in the reading mode.

Comparison outputs of the comparators 5A, 5B, and 5C are supplied to current limiters 8A, 8B, and 8C through low pass filters 7A, 7B, and 7C, respectively. The current limiters 8A to 8C are provided to prevent an abnormal current from flowing through and briefing the laser diode 1. Outputs of the current limiters 8A to 8C are selectively supplied to a drive circuit 10 through a swtich 9. The switch 9 is properly switched by control means (not shown) in accordance with the reading, erasing, or writing mode. Namely, terminals 9A and 9D of the switch 9 are connected in the writing mode and the output of the current limiter 8A is supplied to the drive circuit 10. In the erasing mode, terminals 9B and 9D are connected and the output of the current limiter 8B is supplied to the drive circuit 10. In the reading mode, terminals 9C and 9D are connected and the output of the current limiter 8C is supplied to the drive circuit 10. Thus, an output of the drive circuit 10 corresponding to the output from the current limiter connected by the switch 9 is supplied to the laser diode 1. The light emission power of the laser diode 1 is thereby controlled in accordance with the output of the drive circuit 10. However, in the writing mode, a modulation signal based on an information signal to be recorded is supplied from a terminal 11 to the drive circuit 10. A laser beam modulated by the modulation signal is set to the optimum power level in the writing mode on the basis of the output of the current limiter 8A by the switch 9 and output from the laser diode 1. This laser beam is irradiated onto the recording medium of the disc.

The operation of an embodiment of the invention will next be described.

As mentioned above, the servo area SA$_1$ and the servo area SA$_2$ subsequent to the servo area SA$_1$ are formed in the magnetooptic disc. Therefore, when the magnetooptic disc is rotated by rotation driving means (not shown), as shown in FIG. 8A, a laser beam from the laser diode 1 scans the servo areas $SA_1$ and $SA_2$ between data areas DA. As shown in FIG. 8B, the sampling pulse SBR which is supplied to the sample and hold circuit 4C is set to the high level for the period of time corresponding to the area 1 in which no pit is formed in the servo area $SA_1$. The sampling pulses SBW and SBE which are supplied to the sample and hold circuits 4A and 4B are alternately set to the high level in every area for the period of time corresponding to the servo area $SA_2$ as shown in FIGS. 8C and 8D.

Therefore, in the area 1 in the servo area $SA_1$, the detection output of the photo diode 2 is held in the sample and hold circuit 4C. The output of the sample and hold circuit 4C is compared with the target value $Vr_3$ by the comparator 5C. The comparison output is then supplied to the low pass filter 7C.

In the servo area $SA_2$, the detection output of the photo diode 2 is alternately held in the sample and hold circuits 4A and 4B for every area. The outputs of the sample and hold circuits 4A and 4B are respectively supplied to the comparators 5A and 5B. The comparison outputs of the comparators 5A and 5B are then supplied to the low pass filters 7A and 7B, respectively.

Namely, the power of the laser diode 1 is controlled to the optimum power in the reading mode on the basis of the detection output of the photo diode 2 in the area 1 in the servo area $SA_1$. The power of the laser diode 1 is controlled to the optimum power in each of the writing and erasing modes on the basis of the detection output of the photo diode 2 in the servo area $SA_2$. The detection output in the area 1 in the servo area $SA_1$ and the detection output in the servo area $SA_2$ are sampled and held in the sample and hold circuits 4A, 4B, and 4C a plurality of times. These detection outputs are sequentially compared with the target values by the comparators 5A, 5B, and 5C, thereby enabling an automatic power control to become stable. The optimum values in the writing, erasing, and reading modes are stored in the low pass filters 7A, 7B, and 7C, respectively.

In this manner, the optimum values in the writing, erasing, and reading modes are respectively stored in the low pass filters 7A, 7B, and 7C. The automatic power control loops in the writing, erasing, and reading modes are respectively stable. Thus, when the operating mode is switched among the writing, erasing, and reading modes by control means (not shown), the output of the laser diode 1 is immediately set to a target value in correspondence to the switched mode.

In the foregoing embodiment, the detection output is alternately held in the sample and hold circuits 4A and 4B for every area in the servo area $SA_2$. In general, since the time-dependent change component of the laser diode 1 is sufficiently low, no problem occurs even if the detection output is alternately sampled in every area in this manner. It is also possible to divide the servo area $SA_2$ into an interval to sample and hold in the sample and hold circuit 4A, and an interval to sample and hold in the sample and hold circuit 4B. It is sufficient that in length of the servo area $SA_2$ is set to a value corresponding to only a time sufficient to sample the peak value of the photo diode 2; therefore, it may be a very short length of, e.g., one pit. Accordingly, a deterioration in use efficiency by providing the servo area $SA_2$ does not cause a problem.

Further, in the foregoing embodiment, the laser diode 1 in the reading mode is controlled by use of the detection output which was sampled in the area 1 in which no pit is formed. Therefore, the laser diode 1 can be controlled in the optimum state without being influenced by the modulation component due to the guide groove.

The embodiment of the invention has been described with respect to a magnetooptic disc recording and reproducing apparatus of the optical modulation system in which by supplying a modulation signal based on an information signal to the drive circuit 10 of the laser diode 1, a laser beam, emitted from the laser diode 1, i.e., a recording beam is modulated, thereby recording the information signal. However, the invention can be also applied to a magnetic field modulation system in which a modulation signal based on an information signal is supplied to external magnetic field generating means (not shown) which is used to reverse the magnetization direction, and a drive signal at a DC level necessary to record or erase is supplied from the drive circuit 10 to the laser diode 1. Further, the invention is not limited to only a magnetooptic disc but can be also applied to unerasable optical discs of the phase transition type, write-once type, and the like.

According to the invention, the detection output in the servo area $SA_1$ is sampled and held in the sample and hold circuit 4C and the detection output in the servo area $SA_2$ is sampled and held in the sample and hold circuits 4A and 4B. The power of the laser diode 1 in the reading mode is controlled on the basis of the detection output held in the sample and hold circuit 4C. The power of the laser diode 1 in the writing and reading modes is controlled on the basis of the detection outputs sampled and held in the sample and hold circuits 4A and 4B. Therefore, when the operating mode was switched among the writing, erasing, and reading modes, the power of the laser diode 1 can be immediately set to a target value.

On the other hand, according to the invention, control loops in the reading, writing, and erasing modes are individually constituted. Therefore, the characteristic of the loop in each mode can be optimized. In addition, since the control loop is individually controlled in each mode, the current limiters 8A, 8B, and 8C can be optimized in each mode and the reliability improved.

Therefore, a recording area of a disc can be effectively used without decreasing the recording density of the disc. An additional time until the power of laser diode rises is thereby eliminated. Even if the operating mode was switched, the power of laser diode immediately rises. Therefore, an apparatus having a high response speed can be realized.

Although the present invention has been shown and described with respect to a preferred embodiment, various changes and modifications which are obvious to a person skilled in the art to which the invention pertains are deemed to lie within the spirit and scope of the invention.

What is claimed is:

1. An apparatus for recording and reproducing data into/from an optical disc in which part of a recording area on the disc is provided with an extracting area defining a time during which a light emission power from a laser light source is detected, comprising:
a detector to detect the light emission power of said laser light source;
power setting means for sampling and holding a detection output from said detector, for comparing the value of said sampled and held output with a target value, and for setting the light emission power of the laser light source on the basis of a comparison output; and drive means for driving said laser light source in response to an output of said power setting means, whereby the light emission power of said laser light source is controlled on the basis of the output value sampled and held by said power setting means corresponding to the light emission power detected during said time defined by said extracting area.

2. An apparatus according to claim 1, wherein said power setting means includes, recording power setting means for setting the power of said laser light source when data is recorded into said optical disc, said recording power setting means including a first sample and hold circuit to sample and hold the detection output from said detector, a first comparator to compare an output of said first sample and hold circuit with a first target value, and a first filter which is supplied with a comparison output of said first comparator, and reproducing power setting means for setting the power of said laser light source when the data recorded in the optical disc is reproduced, said reproducing power setting means including a second sample and hold circuit to sample and hold the detection output from the detector, a second comparator to compare an output of said second sample and hold circuit with a second target value, and a second filter which is supplied with a comparison output of said second comparator.

3. An apparatus according to claim 2, wherein said power setting means further includes erasing power setting means for setting the power of said laser light source when the data recorded in the optical disc is erased, said erasing power setting means including a third sample and hold circuit to sample and hold the detection output from said detector, a third comparator to compare an output of said third sample and hold circuit with a target value for erasing the data, and a third filter which is supplied with a comparison output of said third comparator.

4. An apparatus according to claim 3, wherein said power setting means includes switching means for selectively switching the outputs of said recording power setting means, said reproducing power setting means, and said erasing power setting means in accordance with each of a recording, a reproducing, and an erasing mode and for supplying said outputs to said drive means.

5. An optical disc having an optical recording medium including a plurality of tracks and into which an information signal can be optically recorded, wherein a part of a recording area for said information signal is provided with an extracting area to set a light emission power of a laser light source so as to enable recording and reproduction of said information signal.

6. An optical disc according to claim 5, wherein said recording area has a control area in which a control signal for allowing an emission light from said laser light source to track said plurality of tracks is recorded.

7. An optical disc according to claim 6, wherein said control area is provided in said recording area so as to be on an upstream side relative to said extracting area.

8. An optical disc having an optical recording medium which includes a plurality of tracks into and from which an information signal can be optically recorded and erased, wherein a part of a recording area for said information signal is provided with an extracting area to set a light emission power of a laser light source to enable recording, erasure and reproduction of said information signal.

9. An optical disc according to claim 8, wherein said recording area has a control area in which a control signal for allowing an emission light from said laser light source to track said plurality of tracks is recorded.

10. An optical disc according to claim 9, wherein said control area is provided in said recording area so as to be on an upstream side relative to said extracting area.

* * * * *